US007102713B2

United States Patent
Nam et al.

(10) Patent No.: US 7,102,713 B2
(45) Date of Patent: Sep. 5, 2006

(54) TRANSFLECTIVE LIQUID CRYSTAL DISPLAY DEVICE HAVING GROOVE IN BUFFER LAYER AND FABRICATING METHOD THEREOF

(75) Inventors: Mi-Sook Nam, Gyeonggi-do (KR);
Sang-Min Jang, Gyeonggi-do (KR);
Su-Seok Choi, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 70 days.

(21) Appl. No.: 10/665,436

(22) Filed: Sep. 22, 2003

(65) Prior Publication Data

US 2004/0125290 A1 Jul. 1, 2004

(30) Foreign Application Priority Data

Dec. 30, 2002 (KR) ............. 10-2002-0086523

(51) Int. Cl.
*G02F 1/1335* (2006.01)
*G02F 1/1333* (2006.01)

(52) U.S. Cl. .............. 349/114; 349/113; 349/106; 349/110

(58) Field of Classification Search .......... 349/113, 349/114, 106, 107
See application file for complete search history.

(56) References Cited

U.S. PATENT DOCUMENTS 5,408,345 A 4/1995 Mitsui et al.
6,195,140 B1 2/2001 Kubo et al.
2002/0003596 A1* 1/2002 Kim .................. 349/106
2002/0101552 A1* 8/2002 Yi et al. ............ 349/106
2003/0160918 A1* 8/2003 Rho ................... 349/113
2003/0179327 A1* 9/2003 Nonaka et al. ..... 349/106

FOREIGN PATENT DOCUMENTS

JP 2000-298271 10/2000
JP 2001-183646 7/2001
JP 2002-062525 2/2002

* cited by examiner

*Primary Examiner*—Andrew Schechter
*Assistant Examiner*—Michael H. Caley
(74) *Attorney, Agent, or Firm*—McKenna Long & Aldridge LLP

(57) ABSTRACT

A color filter substrate for a transflective liquid crystal display device includes: a substrate having a plurality of pixel regions, each of the plurality of pixel regions having reflective and transmissive portions; a black matrix on the substrate; a buffer layer on the black matrix, the buffer layer having a groove corresponding to the black matrix; a color filter layer on the buffer layer, the color filter layer having a first thickness in the reflective portion and a second thickness in the transmissive portion wherein the first thickness is substantially half of the second thickness, the color filter layer having a step difference at a border between the reflective and transmissive portions; and a common electrode on the color filter layer.

24 Claims, 8 Drawing Sheets

TRANSFLECTIVE LIQUID CRYSTAL DISPLAY DEVICE HAVING GROOVE IN BUFFER LAYER AND FABRICATING METHOD THEREOF

This application claims the benefit of Korean Patent Application No. 2002-86523, filed on Dec. 30, 2002, which is hereby incorporated by reference for all purposes as if fully set forth herein.

BACKGROUND OF THE INVENTION

1. Field of the Invention

The present invention relates to a liquid crystal display device, and more particularly to a transflective liquid crystal display device selectively using reflective and transmissive modes and having equivalent light efficiency and color reproducibility in reflective and transmissive portions, and a fabricating method thereof.

2. Discussion of the Related Art

Generally, transflective liquid crystal display (LCD) devices function as both transmissive and reflective LCD devices. Because the transflective LCD devices can use both a backlight and the exterior natural or artificial light, the transflective LCD devices are usable in more circumstances, and power consumption of transflective LCD devices can be reduced.

FIG. 1 is a schematic plane view of an array substrate for a transflective liquid crystal display device according to the related art. A gate line 52 and a data line 62 are formed on a substrate 50. A gate line 52 and a data line 62 cross each other to define a pixel region "P." A thin film transistor (TFT) "T," including a gate electrode 54, an active layer 56, and source and drain electrodes 58 and 60, is disposed at a crossing of the gate line 52 and the data line 62. The pixel region "P" includes a reflective portion "C" and a transmissive portion "D." A reflective electrode 64 and a transparent electrode 66 correspond to the reflective portion "C" and the transmissive portion "D," respectively. The reflective electrode 64 having a transmissive hole 64a can be formed over the transparent electrode 66. A metal pattern 63 with an island shape overlaps a portion of the gate line 52 and contacts the reflective electrode 64 or the transparent electrode 66. The metal pattern 63 and the overlapped portion of the gate line 52 constitute a storage capacitor "$C_{ST}$."

FIGS. 2 and 3 are schematic cross-sectional views, which are taken along a line "I—I" of FIG. 1, showing a transflective liquid crystal display device according to first and second embodiments of the related art, respectively.

In FIGS. 2 and 3, first and second substrates 50 and 80 face into and are spaced apart from each other. The first and second substrates 50 and 80 include a plurality of pixel regions "P." A gate line (not shown) and a data 62 line crossing each other are formed on an inner surface of the first substrate 50. Red, green, and blue sub-color filters 84a and 84b are formed on an inner surface of the second substrate 80, and a black matrix 82 is formed between the sub-color filters 84a and 84b. A transparent common electrode 86 is formed on the sub-color filters 84a and 84b and the black matrix 82. The pixel region "P" includes a reflective portion "C" and a transmissive portion "D." Generally, a reflective electrode 64 corresponding to the reflective portion "C" and a transparent electrode 66 corresponding to the transmissive portion "D" are formed over an inner surface of the first substrate 50. The reflective electrode 64 having a transmissive hole "64a" can be formed over or under the transparent electrode 66.

In the transflective LCD device, it is very important to obtain an equivalent optical efficiency in the reflective and transmissive portions "C" and "D." In FIG. 2, because the light path (the distance that light transverses when light passes through a liquid crystal layer) in the reflective portion "C" is different from that in the transmissive portion "D," the polarization properties in the reflective and transmissive portions "C" and "D" are also different from each other. When light passes through a liquid crystal layer 90 having a thickness "d" in the transmissive portion "D," light passing through the liquid crystal layer 90 in the reflective portion "C" is reflected at the reflective electrode 64 and then passes through the liquid crystal layer 90 again. Accordingly, light path in the reflective portion "C" is twice of that in the transmissive portion "D". Thus, light has different polarization properties in the reflective and transmissive portions "C" and "D," thereby a difference in light efficiency is generated.

To solve this problem, as shown in FIG. 3, an insulating layer 63 in the transmissive portion "D" has an open portion 61 so that light path in the reflective portion "C" can be the same as that in the transmissive portion "D." When the liquid crystal layer 90 in the reflective portion "C" has a first thickness of "d," the liquid crystal layer 90 in the transmissive portion "D" has a second thickness of "2d." In other words, the liquid crystal layer 90 has a dual cell gap.

However, even though light efficiency of the reflective portion "C" is the same as that of the transmissive portion "D" due to the dual cell gap, uniform color reproducibility cannot be obtained. The sub-color filter 84a and 84b in the reflective portion "C" has the same thickness as that in the transmissive portion "D." Light passes through the sub-color filter 84a and 84b twice in the reflective portion "C," while light passes through the sub-color filter 84a and 84b just once in the transmissive portion "D." Accordingly, even though light passing through the transmissive portion "D" is brighter than light reflected from the reflective portion "C," light emitted from the reflective portion "C" has higher color reproducibility than that emitted from the transmissive portion "D." To solve this problem, a method that a sub-color filter having a dual thickness in the reflective and transmissive portions is suggested in Korean Patent Application No. 2000-9979.

FIG. 4 is a schematic cross-sectional view, which is taken along a line "I—I" of FIG. 1, showing a transflective liquid crystal display device according to a third embodiment of the related art. First and second substrates 50 and 80 having a pixel region "P" face into and are spaced apart from each other, and a liquid crystal layer 90 is interposed therebetween. The pixel region "P" includes a reflective portion "C" and a transmissive portion "D." A black matrix 92 is formed on an inner surface of the second substrate 80 at a border of the pixel region "P." A transparent buffer layer 94 corresponding to the reflective portion "C" is formed on the black matrix 82. Red and green sub-color filters 96a and 96b are formed on the buffer layer 94 in the pixel region "P." A common electrode 98 is sequentially formed on the buffer layer 94.

A reflective electrode 64 corresponding to the reflective portion "C" and a transparent electrode 66 corresponding to the transmissive portion "D" are formed on an inner surface of the first substrate 50. Generally, the reflective electrode 64 having a transmissive hole 64a is formed under the transparent electrode 66. Because an insulating layer 63 under the reflective electrode 64 has an open portion 61 corresponding to the transmissive hole 64a, a first thickness "d1" of the liquid crystal layer 90 in the reflective portion "C" may be a half of a second thickness "d2" of the liquid crystal layer 90 in the transmissive portion "D." That is, the second thickness "d2" of the liquid crystal layer 90 in the transmissive portion "D" is substantially twice of the first thickness "d1" of the liquid crystal layer 90 in the reflective portion "C." Each of the sub-color filters 96a and 96b has a thickness ratio of 1:2 in the reflective and transmissive portions "C" and "D" due to the buffer layer 94.

FIGS. 5A to 5F are schematic cross-sectional views showing a fabricating process of a color filter layer of a transflective liquid crystal display device according to a third embodiment of the related art.

In FIG. 5A, a black matrix 92 is formed on a substrate 80 by sequentially depositing and patterning chromium oxide (CrOx) and chromium (Cr). The black matrix 92 is used for low reflectance of an LCD screen. Because the aperture ratio directly depends on the shape of the black matrix 92, the black matrix 92 is formed to cover only a portion corresponding to a switching element (not shown), a gate line (not shown) and a data line (not shown) considering preventing light leakage due to reflected light and the assembly margin of the attachment process. As a result, the substrate in a pixel region is exposed.

In FIG. 5B, a transparent thin film 93 is formed on the black matrix 92 by depositing photopolymeric polymer or organic insulating material. An inorganic insulating material also may be used for the transparent thin film 93.

In FIG. 5C, a buffer layer 94 is formed at a portion corresponding to the reflective portion "C" through a photolithographic process that eliminates the transparent thin film 93 (of FIG. 5A) corresponding to the transmissive portion "D." As a result, the buffer layer 94 is formed on a second substrate 80 corresponding to the reflective portion "C."

In FIG. 5D, a red sub-color filter 96a is formed on the buffer layer 94 by coating and patterning color resin including red dye. Since the color resin fills a portion corresponding to the transmissive portion "D" where the buffer layer 94 is not formed, the red sub-color filter 96a is formed to correspond to one pixel region "P" including the reflective and transmissive portions "C" and "D."

In FIG. 5E, similar to the red sub-color filter 96a, a green sub-color filter 96b is formed on the buffer layer 94 by coating and patterning color resin including green dye.

In FIG. 5F, similar to the red and green sub-color filters 96a and 96b, a blue sub-color filter 96c is formed on the buffer layer 94 by coating and patterning color resin including blue dye, thereby a color filter layer 96 including red, green and blue sub-color filters 96a, 96b and 96c completed. A common electrode 98 is formed on the color filter layer 96 by depositing one of a transparent conductive metallic material group including indium-tin-oxide (ITO) and indium-zinc-oxide (IZO). A planarization layer (not shown) may be formed between the color filter layer 96 and the common electrode 98.

Referring again to FIG. 4, the insulating layer 63 having the open portion 61 is formed to obtain a cell gap ratio of 1:2 in the reflective and transmissive portions "C" and "D," and the buffer layer 94 is formed to obtain a thickness ratio of 1:2 of the color filter layer 96 in the reflective and transmissive portions "C" and "D." However, even though equivalent optical efficiency and color reproducibility is obtained in the reflective and transmissive portions, the fabrication process for the dual cell gap ratio of 1:2 and the thickness ratio of 1:2 is very complex. Moreover, because excess organic materials are used, the production cost increases.

SUMMARY OF THE INVENTION

Accordingly, the present invention is directed to a liquid crystal display device that substantially obviates one or more of the problems due to limitations and disadvantages of the related art.

An advantage of the present invention is to provide a transflective liquid crystal display device in which a liquid crystal layer and a color filter layer have different thicknesses in reflective and transmissive portions.

An advantage of the present invention is to provide a color filter substrate that includes a buffer layer having a groove.

An advantage of the present invention is to provide a forming method of a color filter layer having a thickness ratio of 1:2 in reflective and transmissive portions.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a color filter substrate for a transflective liquid crystal display device includes: a substrate having a plurality of pixel regions, each of the plurality of pixel regions having reflective and transmissive portions; a black matrix on the substrate; a buffer layer on the black matrix, the buffer layer having a groove corresponding to the black matrix; a color filter layer on the buffer layer, the color filter layer having a first thickness in the reflective portion and a second thickness in the transmissive portion wherein the first thickness is substantially half of the second thickness, the color filter layer having a step difference at a border between the reflective and transmissive portions; and a common electrode on the color filter layer.

In another aspect of the present invention, a fabricating method of a color filter substrate for a transflective liquid crystal display device includes: forming a black matrix on a substrate having a plurality of pixel regions, each of the plurality of pixel regions having reflective and transmissive portions; forming a buffer layer on the black matrix, the buffer layer having a groove corresponding to the black matrix; forming a color filter layer on the buffer layer, the color filter layer having a first thickness in the reflective portion and a second thickness in the transmissive portion wherein the first thickness is substantially half of the second thickness, the color filter layer having a step difference at a border between the reflective and transmissive portions; and forming a common electrode on the color filter layer.

In another aspect of the present invention, a transflective liquid crystal display device includes: first and second substrates facing into and spaced apart from each other; a gate line on an inner surface of the first substrate; a data line crossing the gate line to define a pixel region having reflective and transmissive portions; a thin film transistor connected to the gate line and the data line; a reflective layer in the reflective portion; a transparent electrode in the transmissive portion, the transparent electrode being connected to the thin film transistor; a black matrix on an inner surface of the second substrate; a buffer layer on the black matrix, the buffer layer having a groove corresponding to the black matrix; a color filter layer on the buffer layer, the color filter layer having a first thickness in the reflective portion and a second thickness in the transmissive portion wherein the first thickness is substantially half of the second thickness, the color filter layer having a step difference at a border between the reflective and transmissive portions; a common electrode on the color filter layer; and a liquid crystal layer interposed between the transparent electrode and the common electrode.

In another aspect of the present invention, a fabricating method of a transflective liquid crystal display device includes: forming a gate line on a first substrate; forming a data line crossing the gate line to define a pixel region having reflective and transmissive portions; forming a thin film transistor connected to the gate line and the data line; forming a reflective layer in the reflective portion; forming a transparent electrode in the transmissive portion, the transparent electrode being connected to the thin film transistor; forming a black matrix on a second substrate; forming a buffer layer on the black matrix, the buffer layer having a groove corresponding to the black matrix; forming a color filter layer on the buffer layer, the color filter layer having a first thickness in the reflective portion and a second thickness in the transmissive portion wherein the first thickness is substantially half of the second thickness, the color filter layer having a step difference at a border between the reflective and transmissive portions; forming a common electrode on the color filter layer; attaching the first and second substrates wherein the transparent electrode and the common electrode face into each other; and forming a liquid crystal layer between the transparent electrode and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, an example of which is illustrated in the accompanying drawings. Wherever possible, similar reference numbers will be used throughout the drawings to refer to the same or like parts.

Figure 1:
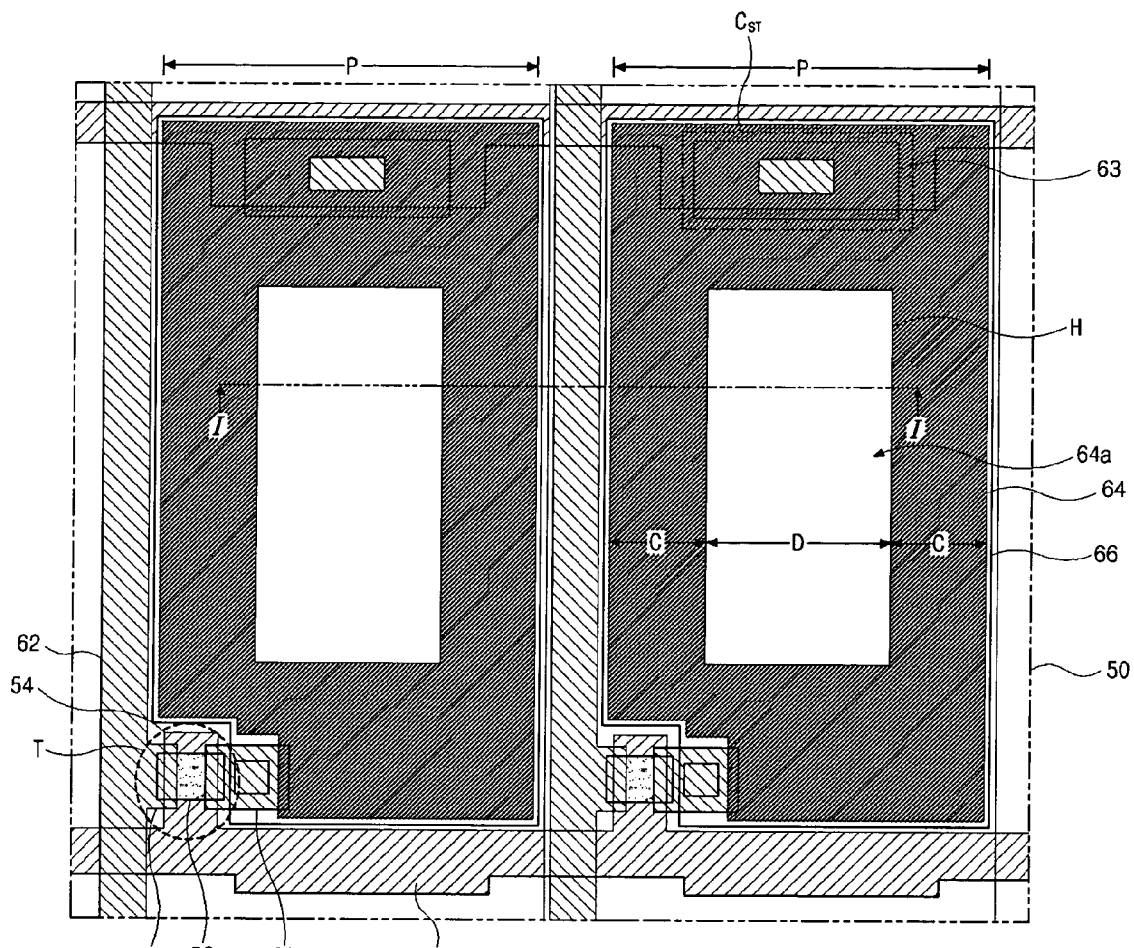
FIG. 1 is a schematic plane view of an array substrate for a transflective liquid crystal display device according to the related art.
Figure 2:
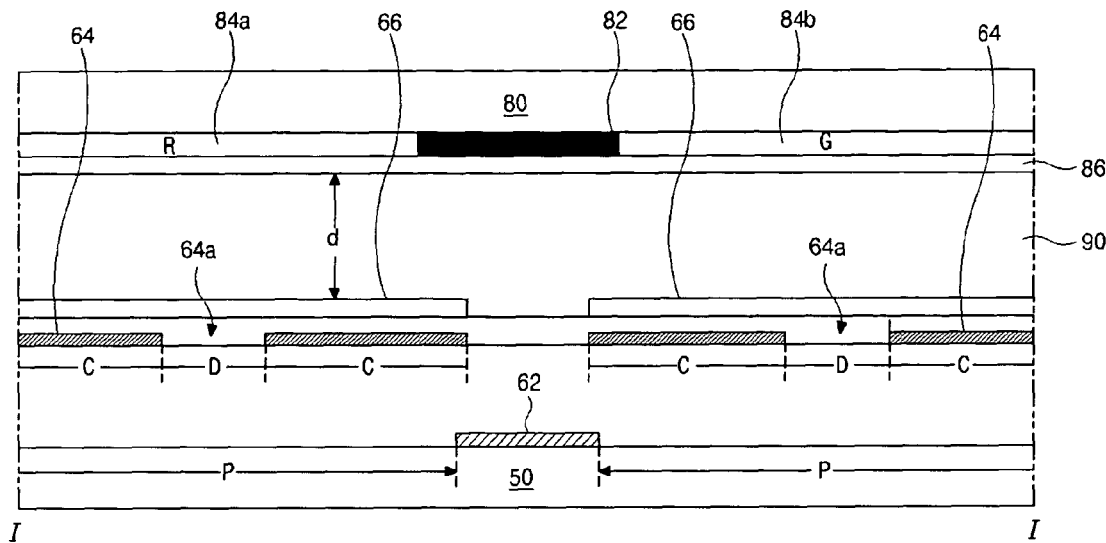
FIG. 2 is a schematic cross-sectional view, which is taken along a line "I—I" of FIG. 1, showing a transflective liquid crystal display device according to a first embodiment of the related art.
Figure 3:
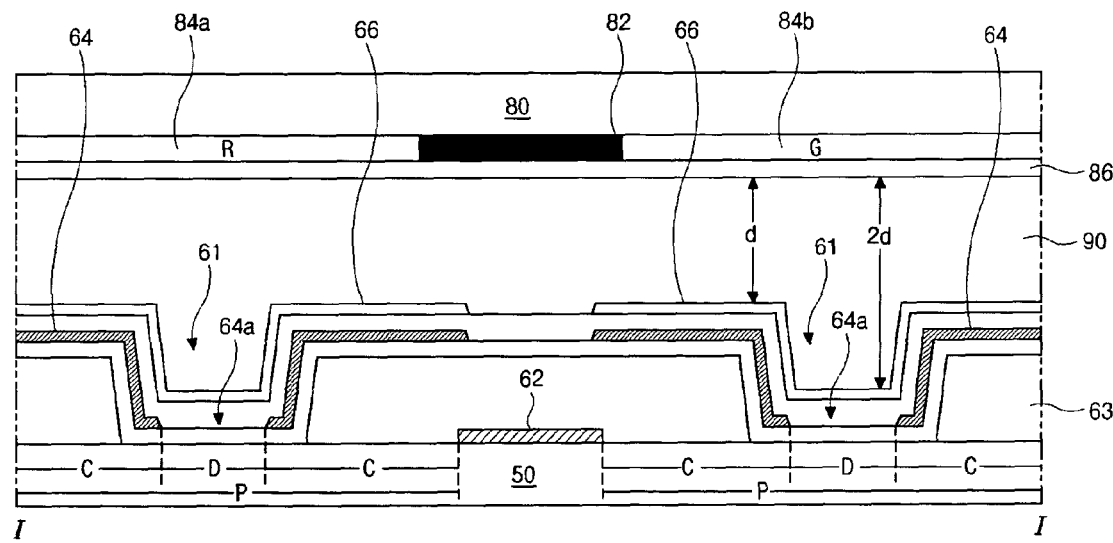
FIG. 3 is a schematic cross-sectional view, which is taken along a line "I—I" of FIG. 1, showing a transflective liquid crystal display device according to a second embodiment of the related art.
Figure 4:
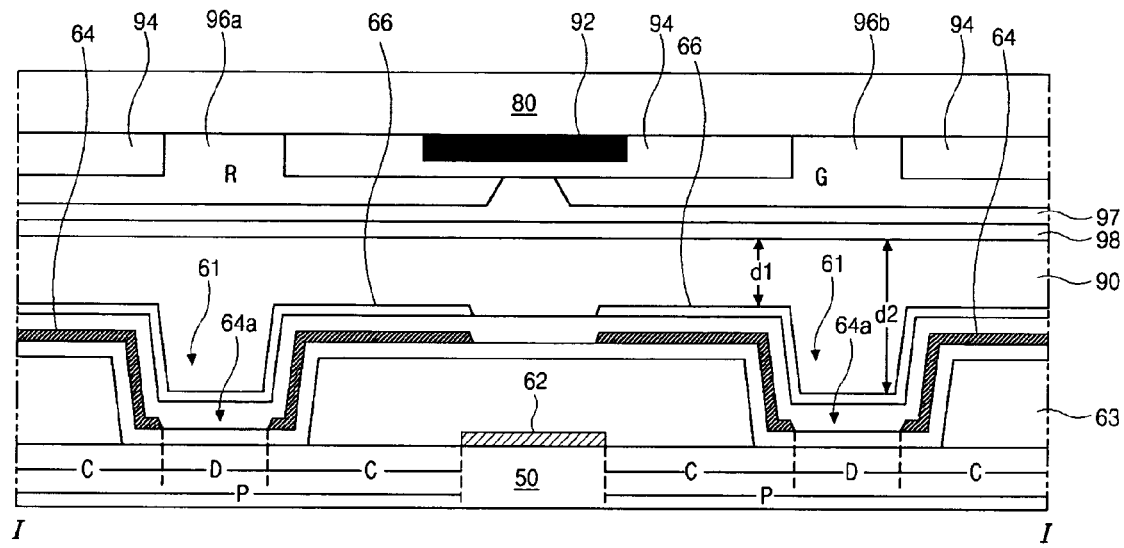
FIG. 4 is a schematic cross-sectional view, which is taken along a line "I—I" of FIG. 1, showing a transflective liquid crystal display device according to a third embodiment of the related art.
Figure 5A:
FIGS. 5A to 5F are schematic cross-sectional views showing a fabricating process of a color filter layer of a transflective liquid crystal display device according to a third embodiment of the related art.
Figure 5B:
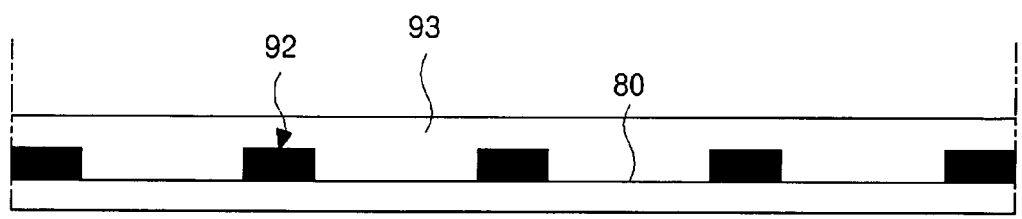
Figure 5C:
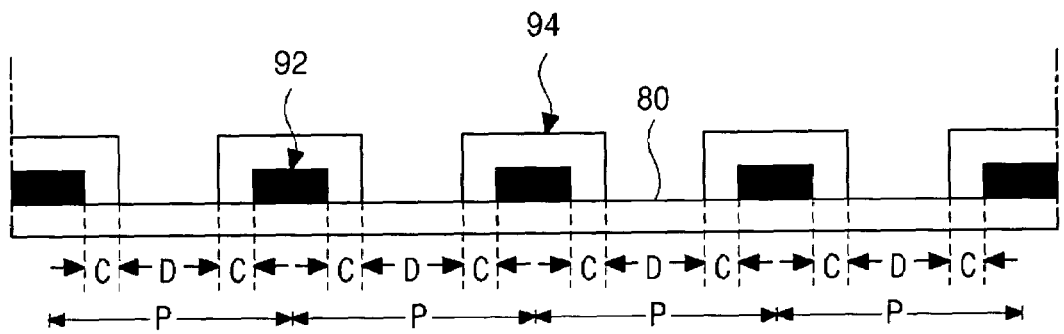
Figure 5D:
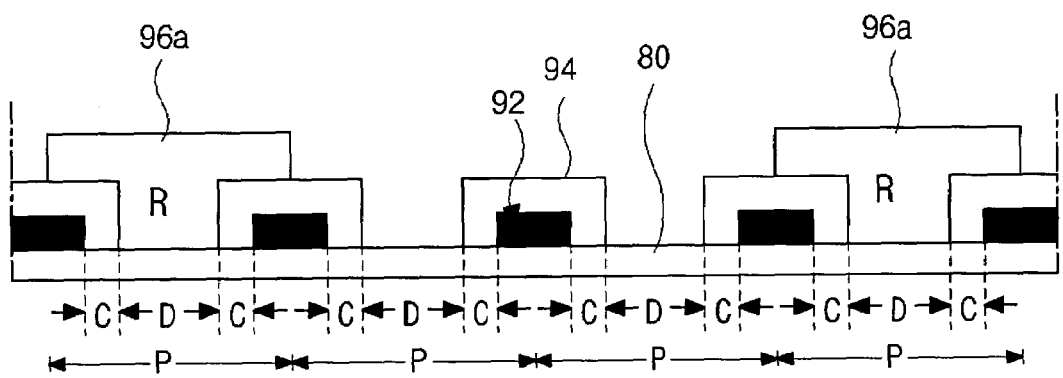
Figure 5E:
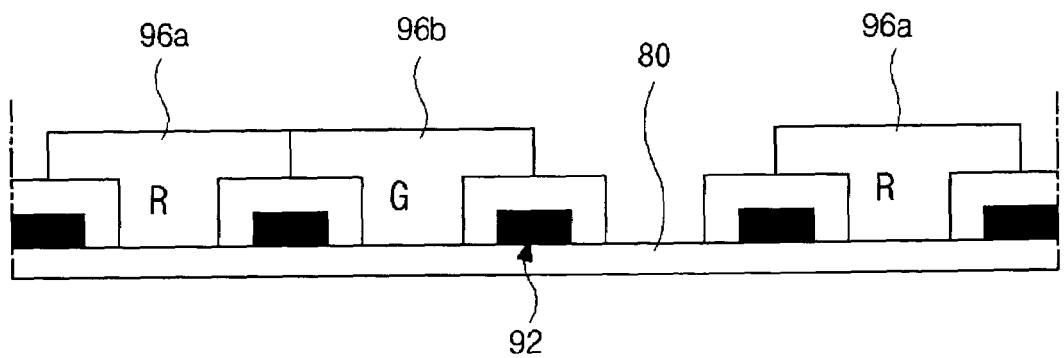
Figure 5F:
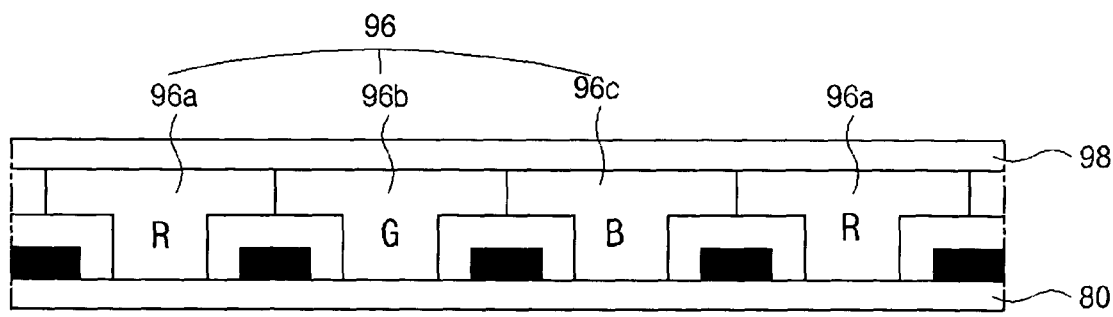
Figure 6:
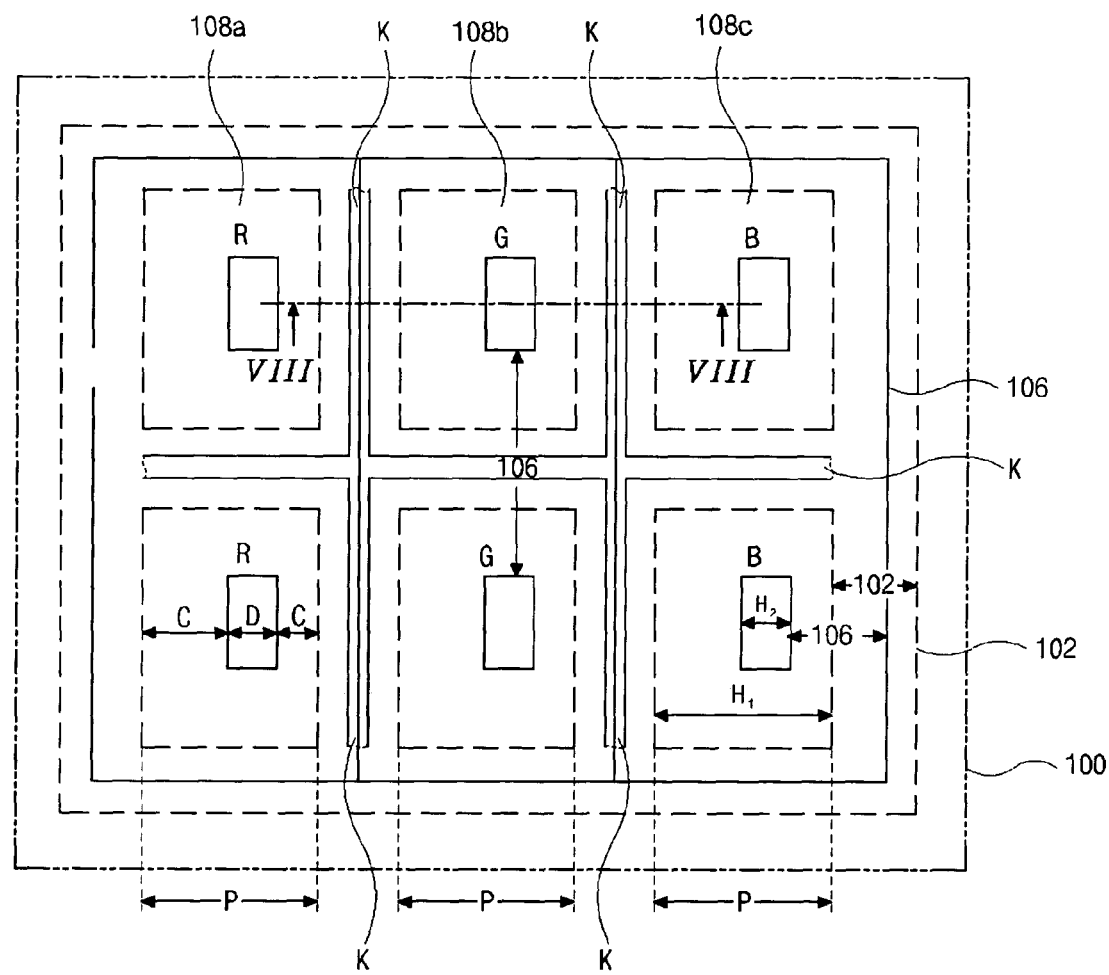
FIG. 6 is a schematic plane view showing a color filter substrate for a transflective liquid crystal display device according to an embodiment of the present invention.
Figure 7:
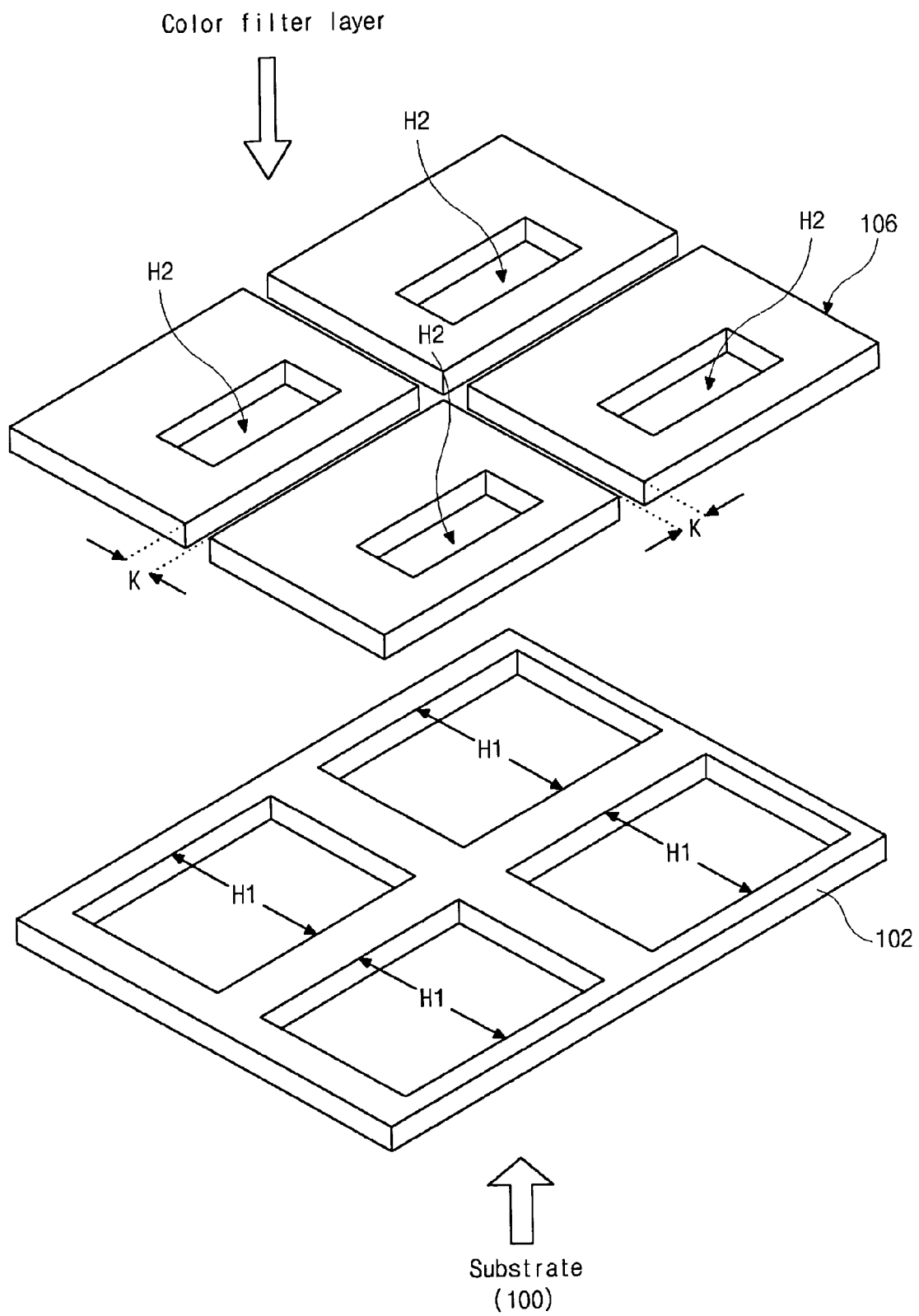
FIG. 7 is a schematic perspective view showing a black matrix and a buffer layer of a color filter substrate for a transflective liquid crystal display device according to an embodiment of the present invention.

FIG. 6 is a schematic plane view showing a color filter substrate for a transflective liquid crystal display device according to an embodiment of the present invention, and FIG. 7 is a schematic perspective view showing a black matrix and a buffer layer of a color filter substrate for a transflective liquid crystal display device according to an embodiment of the present invention.

In FIGS. 6 and 7, a black matrix 102 having a plurality of first open portions "H1" is formed on a substrate 100. The substrate 100 has a plurality of pixel regions "P" and each pixel region "P" includes reflective and transmissive portions "C" and "D." The plurality of first open portions "H1" correspond to the plurality of pixel regions "P." A buffer layer 106 having a plurality of second open portions "H2" is formed on the black matrix 102. The plurality of second open portions "H2" also correspond to the transmissive portion "D." The buffer layer 106 also has a groove "K" between the adjacent second open portions "H2." The groove "K" extends along two directions perpendicular to each other. When color resin is coated on the buffer layer 106, the color resin partially fills the plurality of second open portions "H2." Because the color resin also fills the groove "K," overfilling the plurality of second open portions "H2" with the color resin is prevented. Accordingly, a first thickness of the color resin on the buffer layer 194 in the reflective portion "C" becomes substantially half of a second thickness of the color resin on the substrate 100 in the transmissive portion "D." That is, a thickness ratio of 1:2 of a color filter layer (not shown) in the reflective and transmissive portions "C" and "D" can be easily obtained because the thickness of the color filter layer is well controlled due to the groove.

FIGS. 8A to 8D are schematic cross-sectional views, which are taken along a line "VIII—VIII" of FIG. 6, showing a fabricating method of a color filter substrate for a transflective liquid crystal display device according to an embodiment of the present invention.

Figure 8A:
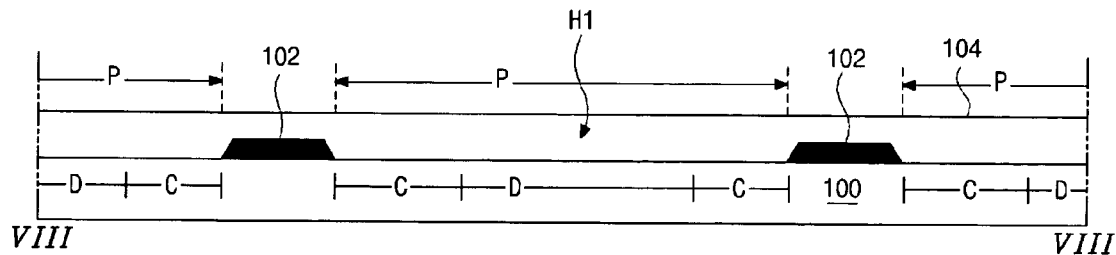
FIGS. 8A to 8D are schematic cross-sectional views, which are taken along a line "VIII—VIII" of FIG. 6, showing a fabricating method of a color filter substrate for a transflective liquid crystal display device according to an embodiment of the present invention.

In FIG. 8A, a black matrix 102 having a plurality of first open portions "H1" is formed on a substrate 100. The substrate 100 has a plurality of pixel regions "P" and each pixel region "P" includes reflective and transmissive portions "C" and "D." The plurality of first open portions "H1" correspond to the plurality of pixel regions "P." A transparent insulating layer 104 is formed on the black matrix 102 by coating one of a transparent organic insulating material group, for example, benzocyclobutene (BCB) and acrylic resin.

Figure 8B:
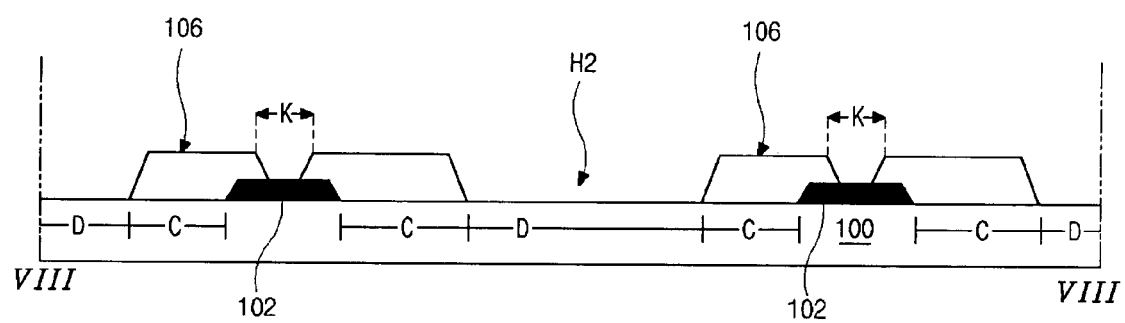

In FIG. 8B, a buffer layer 106 having a plurality of second open portions "H2" and a groove "K" is obtained by patterning the transparent insulating layer 104 (of FIG. 8A). The plurality of second open portions "H2" and the groove "K" correspond to the transmissive portion "D" and the black matrix 102, respectively.

Figure 8C:
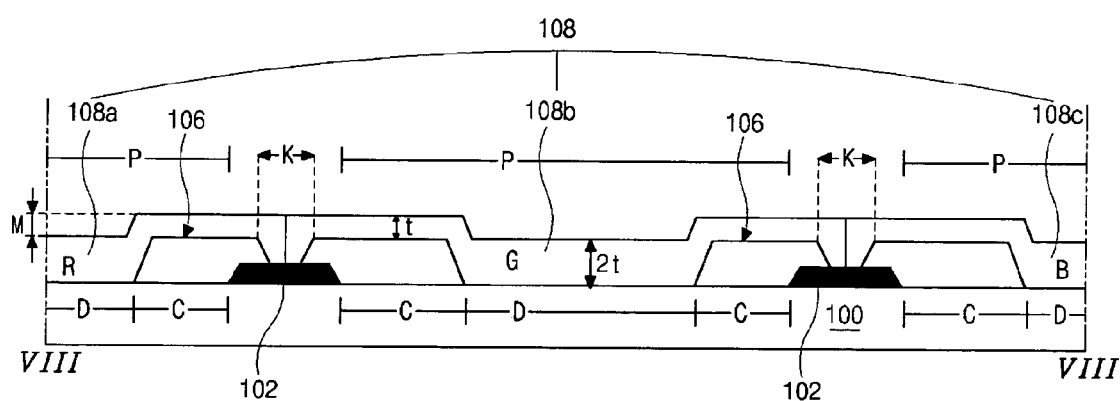

In FIG. 8C, a color filter layer 108 including red, green, and blue sub-color filters 108a, 108b, and 108c is formed on an entire surface of the substrate 100 by coating and patterning color resin. The red, green, and blue sub-color filters 108a, 108b, and 108c corresponding to the pixel region "P" are sequentially formed through similar coating and patterning processes. While the color resin is coated, the color resin filling the plurality of second open portion "H2" partially flows into the groove "K." Accordingly, overfilling the plurality of second open portions "H2" with the color resin is prevented. As a result, a first thickness "t" of the color filter layer 108 in the reflective portion "C" is substantially half of a second thickness "2t" of the color filter layer 108 in the transmissive portion "D." A step difference "M" of the color filter layer 108 between the reflective and transmissive portions "C" and "D" depends on a thickness of the buffer layer 106. For example, to obtain the step difference within a range of about 2.0 μm to about 2.5 μm, the buffer layer 106 may be formed to have a thickness within a range of about 2.5 μm to about 4.0 μm.

Figure 8D:
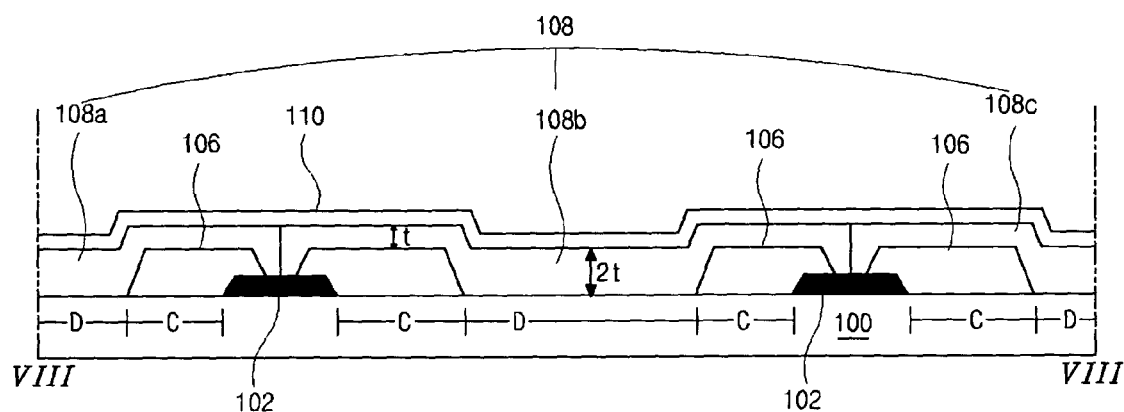

In FIG. 8D, a common electrode 110 is formed on the color filter layer 108 by depositing one of a transparent conductive metallic group, for example indium-tin-oxide (ITO) and indium-zinc-oxide (IZO).

Figure 9:
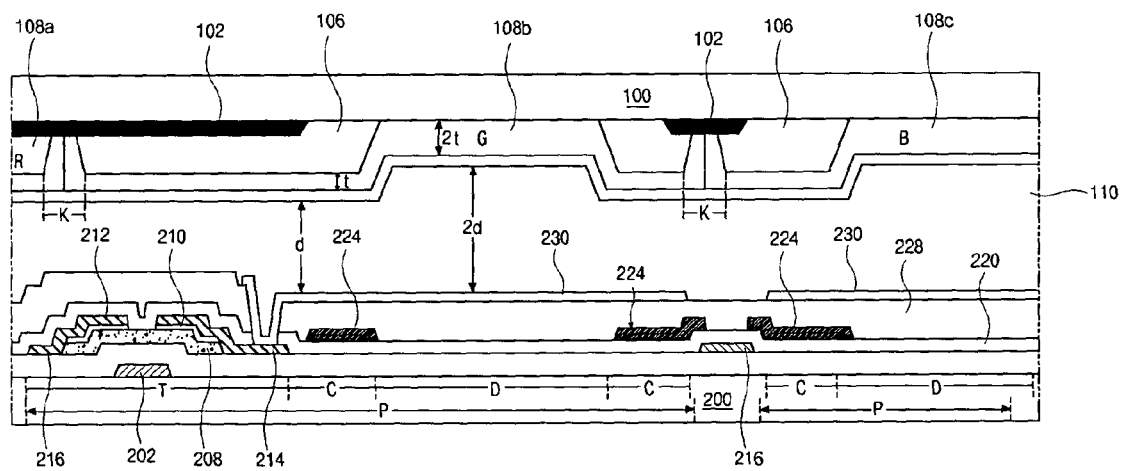
FIG. 9 is a schematic cross-sectional view showing a transflective liquid crystal display device according to an embodiment of the present invention.

FIG. 9 is a schematic cross-sectional view showing a transflective liquid crystal display device according to an embodiment of the present invention. First and second substrates 200 and 100 face into and spaced apart from each other. The first and second substrates 200 and 100 have a plurality of pixel regions "P" and each pixel region "P" includes reflective and transmissive portions "C" and "D." A thin film transistor (TFT) "T" including a gate electrode 202, an active layer 208, an ohmic contact layer 210, and source and drain electrodes 212 and 214 is formed on an inner surface of the first substrate 200. A gate line (not shown) and a data line 216 crossing each other are formed over the inner surface of the first substrate 200. The data line 216 is connected to the source electrode 212. A reflective layer 224 corresponding to the reflective portion "C" is formed on a first insulating layer 220 covering the TFT "T" and the data line 216. A transparent electrode 230 corresponding to the pixel region "P" is formed on a second insulating layer 228 covering the reflective layer 224.

A black matrix 102 is formed on an inner surface of the second substrate 100. The black matrix 102 has a plurality of first open portions "H1" (of FIG. 8A) corresponding to the plurality of pixel regions "P." Moreover, a portion of the black matrix 102 corresponds to the TFT "T." A transparent buffer layer 106 is formed on the black matrix 102. The buffer layer 106 has a plurality of second open portions corresponding to the transmissive portion "D" and a groove "K" corresponding to the gate line (not shown) and the data line 216. A cross-sectional area and a height of the groove "K" may be freely designed because the groove "K" is disposed over the black matrix 102, i.e., the black matrix 102 completely covers the groove "K." A color filter layer 108 including red, green, and blue sub-color filters 108a, 108b, and 108c is formed on the buffer layer 106. Each of the red, green, and blue sub-color filters 108a, 108b, and 108c corresponds to one pixel region "P."

Due to the groove "K," the color filter layer 108 has a first thickness "t" in the reflective portion "C" and a second thickness "2t" in the transmissive portion "D" such that the first thickness "t" is substantially half of the second thickness "2t." At the same time, because the color filter layer 108 has a step at a border between the reflective and transmissive portions "C" and "D," the transflective LCD device has a first cell gap "d" in the reflective portion "C" and a second cell gap "2d" in the transmissive portion "D" such that the first cell gap "d" is substantially half of the second cell gap "2d."

Accordingly, the transflective LCD device has a color filter layer having a step at a border between the reflective and transmissive portions and a reliable thickness ratio of 1:2 in the reflective and transmissive portions. Therefore, because the fabricating process of forming a step on the first substrate is omitted, the whole fabrication process is simplified and equivalent optical efficiency is obtained in the reflective and transmissive portions. Moreover, an equivalent color reproducibility is obtained between the reflective and transmissive portions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A color filter substrate for a transflective liquid crystal display device, comprising:
   a substrate having a plurality of pixel regions, each of the plurality of pixel regions having reflective and transmissive portions;
   a black matrix on the substrate;
   a buffer layer on the black matrix, the buffer layer having a groove corresponding to and over the black matrix;
   a color filter layer on the buffer layer, the color filter layer having a first thickness in the reflective portion and a second thickness in the transmissive portion; and
   a common electrode on the color filter layer.

2. The color filter substrate according to claim 1, wherein the first thickness is substantially half of the second thickness, and the color filter layer has a step difference at a border between the reflective and transmissive portions.

3. The color filter substrate according to claim 2, wherein the buffer layer includes one of a transparent organic insulating material group including benzocyclobutene (BCB) and acrylic resin.

4. The color filter substrate according to claim 3 wherein the buffer layer has a thickness within a range of about 2.5 μm to about 4.0 μm.

5. The color filter substrate according to claim 4, wherein the step difference is within a range of about 2.0 μm to about 2.5 μm.

6. The color filter substrate according to claim 1, wherein the black matrix has a plurality of first open portions corresponding to the plurality of pixel regions.

7. The color filter substrate according to claim 6, wherein the buffer layer has a plurality of second open portions corresponding to the transmissive portion.

8. A fabricating method of a color filter substrate for a transflective liquid crystal display device, comprising:
   forming a black matrix on a substrate having a plurality of pixel regions, each of the plurality of pixel regions having reflective and transmissive portions;
   forming a buffer layer on the black matrix, the buffer layer having a groove corresponding to and over the black matrix;

forming a color filter layer on the buffer layer, the color filter layer having a first thickness in the reflective portion and a second thickness in the transmissive portion; and forming a common electrode on the color filter layer.

9. The method according to claim 8, wherein the first thickness is substantially half of the second thickness, and the color filter layer has a step difference at a border between the reflective and transmissive portions.

10. The method according to claim 9, wherein the buffer layer includes one of a transparent organic insulating material group including benzocyclobutene (BCB) and acrylic resin.

11. The method according to claim 10, wherein the buffer layer has a thickness within a range of about 2.5 µm to about 4.0 µm.

12. The method according to claim 11, wherein the step difference is within a range of about 2.0 µm to about 2.5 µm.

13. The method according to claim 8, wherein the black matrix has a plurality of first open portions corresponding to the plurality of pixel regions.

14. The method according to claim 13, wherein the buffer layer has a plurality of second open portions corresponding to the transmissive portion.

15. A transflective liquid crystal display device, comprising:
first and second substrates facing into and spaced apart from each other;
a gate line on an inner surface of the first substrate;
a data line crossing the gate line to define a pixel region having reflective and transmissive portions;
a thin film transistor connected to the gate line and the data line;
a reflective layer in the reflective portion;
a transparent electrode in the transmissive portion, the transparent electrode being connected to the thin film transistor;
a black matrix on an inner surface of the second substrate;
a buffer layer on the black matrix, the buffer layer having a groove corresponding to and over the black matrix;
a color filter layer on the buffer layer, the color filter layer having a first thickness in the reflective portion and a second thickness in the transmissive portion;
a common electrode on the color filter layer; and
a liquid crystal layer interposed between the transparent electrode and the common electrode.

16. The device according to claim 15, wherein the first thickness is substantially half of the second thickness, and the color filter layer has a step difference at a border between the reflective and transmissive portions.

17. The device according to claim 16, wherein the liquid crystal layer has a third thickness in the reflective portion and a fourth thickness in the transmissive portion wherein the third thickness is substantially a half of the fourth thickness.

18. The device according to claim 17, wherein the buffer layer has a thickness within a range of about 2.5 µm to about 4.0 µm, and wherein the step difference is within a range of about 2.0 µm to about 2.5 µm.

19. The device according to claim 15, wherein the black matrix has a first open portion corresponding to the pixel region, and wherein the buffer layer has a second open portion corresponding to the transmissive portion.

20. A fabricating method of a transflective liquid crystal display device, comprising:
forming a gate line on a first substrate;
forming a data line crossing the gate line to define a pixel region having reflective and transmissive portions;
forming a thin film transistor connected to the gate line and the data line;
forming a reflective layer in the reflective portion;
forming a transparent electrode in the transmissive portion, the transparent electrode being connected to the thin film transistor;
forming a black matrix on a second substrate;
forming a buffer layer on the black matrix, the buffer layer having a groove corresponding to and over the black matrix;
forming a color filter layer on the buffer layer, the color filter layer having a first thickness in the reflective portion and a second thickness in the transmissive portion;
forming a common electrode on the color filter layer;
attaching the first and second substrates wherein the transparent electrode and the common electrode face into each other; and
forming a liquid crystal layer between the transparent electrode and the common electrode.

21. The method according to claim 20, wherein the first thickness is substantially half of the second thickness, and the color filter layer has a step difference at a border between the reflective and transmissive portions.

22. The method according to claim 21, wherein the liquid crystal layer has a third thickness in the reflective portion and a fourth thickness in the transmissive portion wherein the third thickness is substantially a half of the fourth thickness.

23. The method according to claim 22, wherein the buffer layer has a thickness within a range of about 2.5 µm to about 4.0 µm, and wherein the step difference is within a range of about 2.0 µm to about 2.5 µm.

24. The method according to claim 20, wherein the black matrix has a first open portion corresponding to the pixel region, and wherein the buffer layer has a second open portion corresponding to the transmissive portion.

* * * * *